RECORD CHANGER TURNTABLE COVER

Filed Nov. 13, 1964

Inventor
Martin C. Reed
By
Hofgren, Wegner,
Allen, Stellman & McCord Att'ys

United States Patent Office 3,346,262

Patented Oct. 10, 1967

3,346,262

RECORD CHANGER TURNTABLE COVER

Martin C. Reed, Roselle, Ill., assignor to Warwick Electronics Inc., a corporation of Delaware Filed Nov. 13, 1964, Ser. No. 410,942
11 Claims. (Cl. 274—39)

ABSTRACT OF THE DISCLOSURE

A cover for a phonograph turntable including a rigid plastic cover member secured to a conventional phonograph turntable, and having rib means on the upper surface thereof defining concentric recesses having resilient cushioning mats seated therein. The plastic turntable cover may either be heat sealed directly to the conventional turntable, or to an annular weighting flange that extends radially outwardly of the conventional turntable.

This invention relates in general to a record changer, and more particularly to a new and improved turntable for use in a record changer.

In the past, record changer turntables have conventionally been provided with a downwardly extending flange or skirt at the periphery thereof, which is engaged by an idler wheel driven by a motor to rotate the turntable. Heretofore, the over-all size of record changer turntables has been somewhat limited by the fact that the turntable skirt must be positioned at a predetermined location, so as to be located for engagement with the idler wheel of existing drive mechanisms. When playing a twelve-inch record on conventional types of turntables, the peripheral edge of the record has extended a substantial distance outwardly from the turntable. With such turntables, it is apparent that the records are not rigidly supported and when a single record is rotating with a conventional turntable, undesirable vibrations have been commonly imparted to the record. This has often lead to unsatisfactory reproduction of the information recorded upon the record in that the record disc is sometimes vibrated at the resonant frequency thereof. Another disadvantage inherent in the use of conventional small diameter turntables has been the tendency for the turntable to flutter, or vary in speed. The present invention overcomes the disadvantaegs noted above by providing a turntable of relatively large diameter and mass which provides rigid support for large diameter records, and which tends to act as a flywheel, to reduce speed variations of the turntable.

Accordingly, the general purpose of the present invention is to provide a turntable for use in a record changer which obviates the problems noted above.

A more specific object of the present invention is to provide a turntable for a record changer which reduces resonance problems, and which improves playback characteristics of the recorded information on the record disc.

Another object of the invention is to provide a turntable, as described above, with resilient surfaces for cushioning records when they are lowered to the turntable.

A further object of the invention is to provide a turntable, as described above, with a sufficient diameter to provide rigid support for records resting thereon, and with sufficient mass to even out fluctuations in the rotational speed of the turntable.

Still another object of the invention is to provide a relatively inexpensive turntable which readily lends itself to aesthetic design.

A still further object of the invention is to provide conventional record changer turntable with a cover having the characteristics described above.

Still another object of the invention is to mount a turntable cover, as described in the preceding paragraph, in a manner such that the cover is readily removable from the turntable for maintenance purposes, or to change the decorative effect of the record changer.

A related object is to provide turntable cover which is separate from a record changer turntable so that a wide variety of aesthetic designs can be incorporated in the cover when desired.

These and other objects of the invention will hereinafter become more fully apparent from the following description taken in connection with the annexed drawing, wherein.

Figure 1:
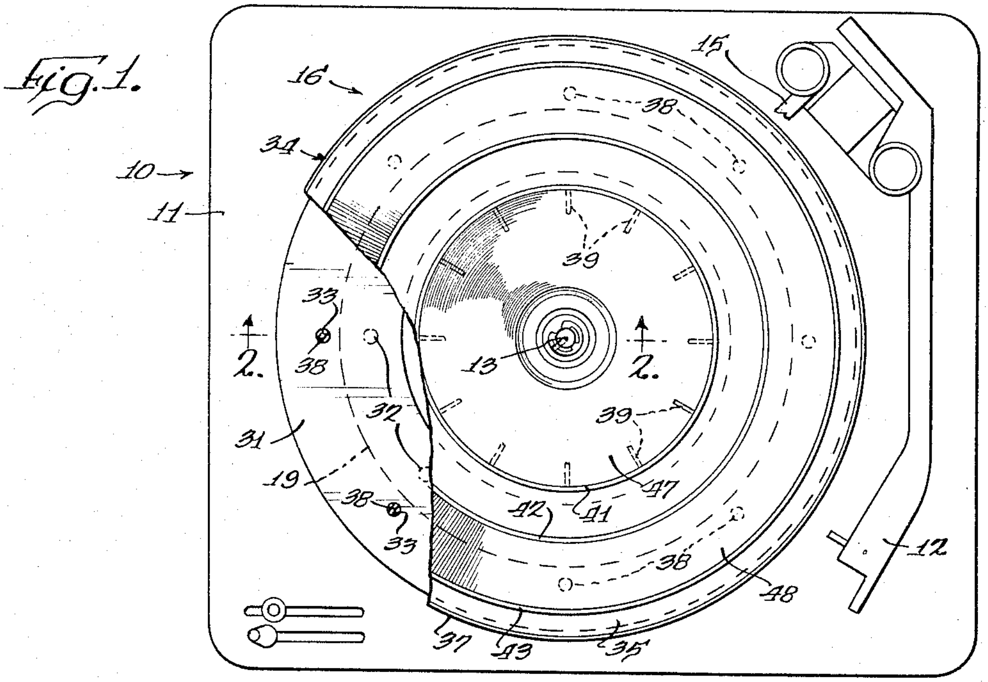
FIG. 1 is a plan view of a record changer, with certain parts broken away for clarity of illustration and showing a first embodiment of the turntable associated therewith.

While this invention is susceptible of embodiment in many different forms, there is shown in the drawing and will herein be described in detail a preferred embodiment of the invention and a modification thereof, with the understanding that the present disclosure is to be considered as an exemplification of the principles of the invention and is not intended to limit the invention to the embodiments illustrated. The scope of the invention will be pointed out in the appended claims.

Referring now to the drawing, wherein like reference characters designate like or corresponding parts throughout the several views, a conventional record changer is illustrated at 10 in FIG. 1, and includes a motorboard 11 rotatably supporting a turntable 16, a spindle 13 adapted to have a stack of records threaded thereon, a tone arm 12 pivotally mounted on the motorboard 11 and having a stylus for tracking the spiral groove of a record, and a pressure arm 15 for retaining a stack of records on a shelf of the spindle 13.

The turntable 16 includes a first turntable member 17, which may be a conventional small diameter metal turntable now in common use. Turntable member 17 includes a circular base 18 having a downwardly extending flange or skirt 19 provided at the periphery thereof. As is well known in the art, the skirt 19 is drivingly engaged by an idler wheel of a conventional drive mechanism (not shown) to impart the desired rotational speed to the turntable. As can be best seen in FIG. 2, the outer portion 20 of base 18 is inclined slightly downwardly, and terminates in an upstanding annular rib 21. Base 18 further includes a generally frusto-conical portion 22 which extends from rib 21 to a central horizontal portion 23 having an opening 24 therein. A hub 25 is mounted in opening 24, and includes an enlarged peripheral flange 26 at the upper end thereof seated upon the upper surface of the horizontal turntable portion 23. A nut 27 cooperates with a threaded portion 28 on the hub 25 to retain the hub in the opening 24. As is well known in the art, the lower portion of hub 25 includes a plurality of vertical teeth 29 for engagement with a record change actuating mechanism, not shown. Hub 25 also includes a central bore, which receives the spindle 13 therein.

An annular metal turntable disc 31 is mounted on the upper surface of base 18, and is secured thereto as by spot welding or the like, at a plurality of circumferentially spaced positions, as shown at 32. As can be best seen in FIG. 1, disc 31 is concentrically positioned upon the base 18, and the inner diameter of the disc 31 is less than the outer diameter of the base 18 while the outer diameter of the disc 31 is larger than the outer diameter of the base 18. A plurality of openings 33 are provided in disc 31, and as can be best seen in FIG. 1, eight openings 33 are provided spaced equiangularly around the disc 31.

Figure 2:
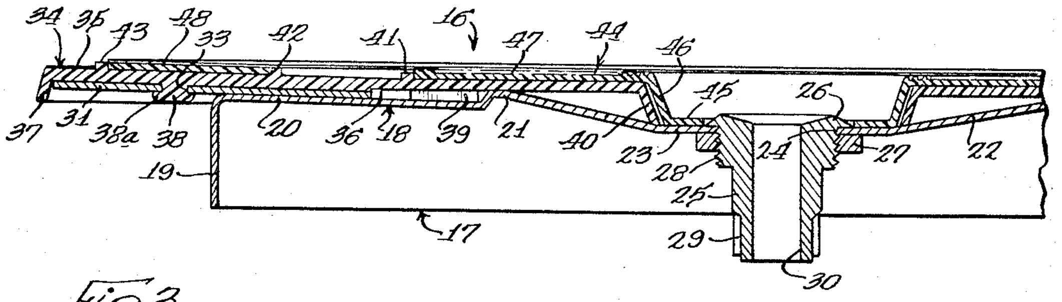
FIG. 2 is an enlarged sectional view, taken generally along line 2—2 of FIG. 1.

The turntable embodiment illustrated in FIGS. 1 and 2 includes a cover 34 which is generally circular in plan view, and which includes an upper surface 35 and a lower surface 36. Cover 34 is formed of a plastic material, such as a suitable acrylic molding compound. With a plastic cover it is possible to economically mold a spun metal effect as part of the mold design. The use of a plastic turntable cover also makes it possible to aesthetically design the visible cover surfaces with various patterns and colors economically. A peripheral flange 37 extends downwardly from the lower surface 36 of the cover 34, and as can be best seen in FIG. 2, is inclined slightly outwardly. Flange 37 embraces the outer diameter of the disc 31 to concentrically mount the cover 34 with respect to the first turntable member 17. A plurality (eight in the embodiment illustrated in FIGS. 1 and 2) of generally cylindrical lugs 38 extend downwardly from the lower surface 36 of the cover 34, and each lug 38 is received in one of the openings in the disc 31. As can be best seen in FIG. 2, the lugs 38 extend below the lower surface of the disc 31, and the cover 34 is heat sealed to the disc 31 by applying heat to the lower end of the lugs 38 to cause them to deform to a position such as that shown in 38*a* in FIG. 2. Sufficient heat is applied to lugs 38 so that the cover 34 is firmly held to the disc 31. However, as can be seen in FIG. 2, only a small portion of the lugs 38 are deformed as shown at 38*a*, so that the cover 34 is readily removable from the first turntable member 17 by applying an upward force on the cover 34 to break the seal between the deformed portions 38*a* of the lugs 38 and the disc 31. A plurality of radial ribs 39 are provided on the undersurface 36 of the cover 34, and rest upon the upper surface of the base 18 adjacent the rib 21 to support the same adjacent the center thereof.

The cover 34 includes a central opening, which is surrounded by a downwardly extending, generally frusto-conically shaped wall 40. A first annular rib 41 is provided on the upper surface 35 of the cover 34 concentrically outwardly of the central opening therein. A second annular rib 42 is provided on the upper surface 35 of the cover 34 concentrically outwardly of the first rib 42. A third annular rib 43 is provided on the upper surface 35 of the cover 34 concentrically outwardly of rib 42. A first turntable mat 44 includes a generally horizontally disposed central portion 45 seated upon the horizontal portion 23 of the base 18. Turntable mat 44 also includes a generally frusto-conically shaped wall 46 extending upwardly and outwardly from the outer edge of the central portion 45. Turntable mat 44 still further includes a portion 47 which extends radially outwardly from the upper end of the frusto-conically shaped wall 46, and mat portion 47 extends radially outwardly to rib 41. A second annularly shaped turntable mat 48 is provided between ribs 42 and 43, and turntable mats 44 and 48 are each preferably secured to the cover 34 by an adhesive. Turntable mats 44 and 48 are formed of a resilient material to cushion the impact of a record being lowered to the turntable. Turntable mat 44 is positioned for engagement by a small diameter record, while turntable mat 48 is positioned for engagement with large diameter records.

Figure 3:
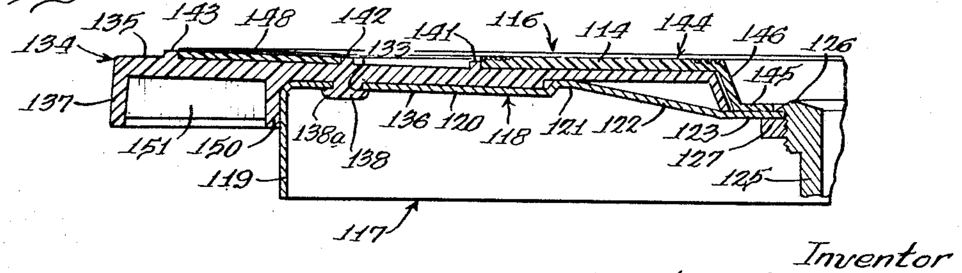
FIG. 3 is a sectional view similar to FIG. 2, but illustrating a second embodiment of the invention.

Turning now to the turntable cover embodiment illustrated in FIG. 3, it will be noted that certain elements of the embodiment illustrated in FIG. 3 are substantially the same as corresponding elements in the embodiment illustrated in FIGS. 1 and 2, so that similar reference numerals have been used to designate corresponding parts in FIG. 3 and have been increased by the sum 100. Because of the similarity between the two embodiments, it is not deemed necessary to describe in detail the corresponding structure in each embodiment, and accordingly, only the distinguishing features in the embodiment of FIG. 3 will be described in detail. A second flange 150 is provided on the undersurface 136 of the cover 134, and is spaced radially inwardly from flange 137. Flange 150 embraces the downwardly extending flange or skirt 119 on the first turntable member 117, to concentrically locate the cover 134 relative to the turntable member 117. A plurality of radially extending ribs 151, only one of which is shown, extend between flanges 137 and 150 to strengthen the peripheral portion of the cover 134. The base 118 of the turntable member 117 is provided with a plurality of openings 133, only one of which is shown, and a plurality of lugs 138 extend downwardly from the undersurface 136 of the cover 134, with each lug 138 extending through one opening 133. The cover 134 is removably secured to the turntable 117 by heat sealing the lugs 138, as shown at 138*a*, in FIG. 3. Thus, it should be apparent that the turntable embodiment illustrated in FIG. 3 eliminates the necessity of a separate disc, such as that shown at 31 in the turntable embodiment in FIGS. 1 and 2.

I claim:

1. A cover for use with a record changer turntable comprising: a rigid unitary circular member having a central opening and a generally planar upper surface, a first annular rib on said upper surface concentrically outwardly of said central opening and defining therebetween a first annular area a resilient first turntable mat received in said first annular area, a second annular rib on said upper surface concentrically outwardly of said first rib, a third annular rib on said upper surface concentrically outwardly of said second rib and defining therebetween a second annular area, a resilient second turntable mat received in said second annular area, and means on the undersurface of said cover for securing the same to said turntable.

2. A cover for use with a record changer turntable comprising: a rigid unitary circular member having a central opening and a generally planar upper surface, a first annular rib on said upper surface concentrically outwardly of said central opening, a second annular rib on said upper surface concentrically outwardly of said first rib, and a third annular rib on said upper surface concentrically outwardly of said second rib; a resilient first turntable mat having a first downwardly extending portion seated within said central opening and a second flat seated portion on said upper surface and extending outwardly from said central opening to said first rib; an annular resilient second turntable mat on said upper surface between said second and third ribs; and means on the undersurface of said cover for securing the same to said turntable.

3. A cover for use with a record changer turntable comprising: a rigid unitary circular member having a central opening and a generally planar upper surface, a first annular rib on said upper surface concentrically outwardly of said central opening and defining therebetween a first annular area, a resilient first turntable mat received within said first annular area, a second annular rib on said upper surface concentrically outwardly of said first rib, a third annular rib on said upper surface concentrically outwardly of said second rib and defining therebetween a second annular area, a resilient second turntable mat received within said second annular area, a first flange extending downwardly from the outer periphery of said circular member, and means on the undersurface of said cover for securing the same to said turntable.

4. A cover as defined in claim 3 in which a second flange extends downwardly from said circular member radially inwardly of said first flange.

5. A cover as defined in claim 4 wherein a plurality of radially extending ribs are provided between said first and second flanges.

6. A turntable for use with a record changer comprising: a first turntable member having a generally circular base with a flange extending downwardly from the periphery thereof; a rigid circular second turntable member having a central opening and a generally planar upper surface, said second turntable member being larger in diameter than said first turntable member, a first annular rib on said upper surface concentrically outwardly of said central opening, a second annular rib on said upper surface concentrically outwardly of said first rib, and a third annular rib on said upper surface concentrically outwardly of asid second rib; a resilient first turntable mat seated within said central opening and having a flat portion on said upper surface and extending outwardly from said central opening to said first rib; and annular resilient second turntable mat on said upper surface between said second and third ribs; and means on the undersurface of said second turntable member for securing the same to said first turntable member.

7. A turntable as defined in claim 6 in which said second turntable member is formed of a plastic material, and wherein said last named means includes a plurality of heat sealing lugs extending downwardly from the undersurface of said second turntable member.

8. A turntable for use with a record changer comprising: a first turntable member having a generally circular base with a skirt extending downwardly from the periphery thereof; an annular disc generally coplanar with said base and having an inner diameter less than the diameter of said base and an outer diameter greater than the diameter of said base; means securing said disc to said base between the inner diameter of said disc and the outer diameter of said base; a circular turntable cover formed of plastic and having a downwardly extending flange at the periphery thereof embracing the outer diameter of said disc; and means on the undersurface of said cover for securing the same to said disc between the outer diameter of said base and the outer diameter of said disc.

9. A turntable as defined in claim 8 in which said disc is provided with a plurality of openings; and wherein said last named means includes a plurality of lugs, each extending downwardly through one of said openings and heat sealed to said disc.

10. A turntable for use with a record changer comprising: a first turntable member having a generally circular base with a skirt extending downwardly from the periphery thereof; a unitary circular turntable cover formed of plastic and having an outer diameter larger than the outer diameter of said base, a first flange extending downwardly from the outer periphery of said cover, a second flange extending downwardly from said cover radially inwardly of said first flange and embracing said skirt, a plurality of ribs extending radially between said first and second flanges; and means on the undersurface of said cover for securing the same to said first turntable member inwardly of the outer diameter thereof.

11. A turntable as defined in claim 10 in which said turntable is provided with a plurality of openings; and wherein said last named means includes a plurality of lugs, each extending downwardly through one of said openings and heat sealed to said first turntable member.

References Cited

UNITED STATES PATENTS

| | | | |
|---|---|---|---|
| 1,352,224 | 9/1920 | Sall | 274—39 |
| 1,438,765 | 12/1922 | Kralund | 274—39 |
| 1,580,037 | 4/1926 | Hall | 274—39 |
| 2,252,896 | 8/1941 | Mounts. | |
| 2,547,725 | 4/1951 | Thompson | 274—39 |
| 3,034,795 | 5/1962 | Guest | 274—39 |

FOREIGN PATENTS

| | | |
|---|---|---|
| 715,277 | 3/1931 | France. |

LEONARD FORMAN, *Primary Examiner.*

F. J. D'AMBROSIO, *Assistant Examiner.*